(12) United States Patent
Yamamoto

(10) Patent No.: US 12,113,440 B2
(45) Date of Patent: Oct. 8, 2024

(54) POWER SUPPLY SYSTEM

(71) Applicant: TOYOTA JIDOSHA KABUSHIKI KAISHA, Toyota (JP)

(72) Inventor: Kazunari Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 17/961,622

(22) Filed: Oct. 7, 2022

(65) Prior Publication Data

US 2023/0208289 A1    Jun. 29, 2023

(30) Foreign Application Priority Data

Dec. 23, 2021   (JP) .................... 2021-209599

(51) Int. Cl.
*H02M 3/155* (2006.01)
*B60L 50/70* (2019.01)
*H01M 8/043* (2016.01)
*H02M 7/537* (2006.01)

(52) U.S. Cl.
CPC ............ *H02M 3/155* (2013.01); *B60L 50/70* (2019.02); *H01M 8/043* (2016.02); *H02M 7/537* (2013.01)

(58) Field of Classification Search
CPC ...... H02M 3/155; H02M 7/537; H01M 8/043; B60L 50/70
USPC ........................................................ 363/13
See application file for complete search history.

(56) References Cited

U.S. PATENT DOCUMENTS

| | | | |
|---|---|---|---|
| 2012/0295174 A1* | 11/2012 | Imanishi | H02M 1/34 323/282 |
| 2013/0320757 A1* | 12/2013 | Shinohara | H01F 27/255 307/10.1 |
| 2016/0079873 A1* | 3/2016 | Inoue | H02M 3/33584 363/21.04 |
| 2019/0149049 A1 | 5/2019 | Tashiro et al. | |
| 2020/0389049 A1 | 12/2020 | Kunii | |
| 2021/0111419 A1* | 4/2021 | Itou | H01M 8/04029 |

FOREIGN PATENT DOCUMENTS

| | | |
|---|---|---|
| JP | 2002-352840 A | 12/2002 |
| JP | 2017-221088 A | 12/2017 |
| JP | 2020-077517 A | 5/2020 |
| JP | 2020-184829 A | 11/2020 |
| JP | 2020-202633 A | 12/2020 |
| JP | 2021-035120 A | 3/2021 |

* cited by examiner

*Primary Examiner* — Yemane Mehari
(74) *Attorney, Agent, or Firm* — Oliff PLC

(57) ABSTRACT

A power supply system includes a power converter and a controller. The power converter includes a positive electrode line, a negative electrode line, first and second switching elements, and a magnetic coupling reactor. The magnetic coupling reactor includes a reactor core, and first and second coils. The second coil is wound around a second outer leg of the reactor core and is magnetically differentially connected to the first coil. The controller is configured to execute a first discharge process and a second discharge process, which is executed after the first discharge process, to discharge electric charge remaining in the fuel cell. The controller is configured to, in the first discharge process, turn on the first switching element in a state where the second switching element is off, and, in the second discharge process, turn on the second switching element in a state where the first switching element is on.

13 Claims, 8 Drawing Sheets

POWER SUPPLY SYSTEM

CROSS-REFERENCE TO RELATED APPLICATION

This application claims priority to Japanese Patent Application No. 2021-209599 filed on Dec. 23, 2021, incorporated herein by reference in its entirety.

BACKGROUND

1. Technical Field

A technology disclosed in the specification relates to a power supply system. The technology specifically relates to a power supply system that includes a power converter connected to a fuel cell, and a controller.

2. Description of Related Art

Japanese Unexamined Patent Application Publication No. 2021-035120 (JP 2021-035120 A) describes a power converter (referred to as first converter in JP 2021-035120 A) connected to a fuel cell and configured to step up the input power of the fuel cell. The power converter includes a smoothing capacitor, and a first resistor connected in parallel with the smoothing capacitor. When a power supply system including the power converter shifts from a steady operation state to a stopped state, electric charge remaining in the smoothing capacitor is slowly discharged via the first resistor. The first resistor functions as a so-called discharge resistance.

SUMMARY

Generally, a resistor that functions as a discharge resistance has a large resistance value. For this reason, the power converter of JP 2021-035120 A discharges electric charge remaining in the smoothing capacitor (hereinafter, may be referred to as residual electric charge) over a relatively long period of time. However, for example, at the time of maintenance of a power supply, it is desired to quickly discharge residual electric charge in a fuel cell. If residual electric charge in a fuel cell is discharged in a short period, a large current flows through a power converter in a short period of time, with the result that the devices (for example, switching elements) of the power converter can be damaged. The specification provides a technology capable of, when residual electric charge in a fuel cell is discharged, quickly discharging the residual electric charge as compared to an exiting technology while suppressing an excessive increase in the value of current flowing through a power converter.

The specification discloses an aspect of a power supply system that includes a power converter and a controller. The power converter includes a positive electrode line, a negative electrode line, a first switching element, a second switching element, and a magnetic coupling reactor. The positive electrode line is connected to a positive electrode of a fuel cell. The negative electrode line is connected to a negative electrode of the fuel cell. The first switching element is connected between the positive electrode line and the negative electrode line. The second switching element is connected between the positive electrode line and the negative electrode line in parallel with the first switching element. The magnetic coupling reactor includes a reactor core, a first coil, and a second coil. The reactor core has a first outer leg, a second outer leg, and a pair of yokes annularly coupling the first outer leg and the second outer leg. The first coil is connected between the first switching element and the fuel cell and is wound around the first outer leg of the reactor core. The second coil is connected between the second switching element and the fuel cell and is wound around the second outer leg of the reactor core. The second coil is magnetically differentially connected to the first coil. The controller is configured to execute a first discharge process and a second discharge process, which is executed after the first discharge process, to discharge electric charge remaining in the fuel cell. The controller is configured to, in the first discharge process, turn on the first switching element in a state where the second switching element is off, and, in the second discharge process, turn on the second switching element in a state where the first switching element is on.

With the above-described configuration, the first discharge process and the second discharge process are sequentially executed to discharge residual electric charge in the fuel cell. In the first discharge process, the controller turns on the first switching element in a state where the second switching element is off. Thus, residual electric charge in the fuel cell is discharged through the first coil. While the first discharge process is being executed, magnetic flux is generated in the reactor core around which the first coil is wound, an excessive increase in current flowing through the first coil is suppressed by the self-inductance of the first coil. In the second discharge process that is executed after the first discharge process, the controller turns on the second switching element in a state where the first switching element is on. Thus, residual electric charge in the fuel cell is discharged through not only the first coil but also the second coil. The second coil is magnetically differentially connected to the first coil. Thus, when a current flows through the two coils, magnetic fluxes respectively generated by the two coils cancel out each other, so the reactance of the magnetic coupling reactor is substantially eliminated or reduced. Therefore, while the second discharge process is being executed, residual electric charge in the fuel cell is discharged in a short period of time regardless of the presence of the magnetic coupling reactor. Here, at the time when the second discharge process is started, part of residual electric charge in the fuel cell has been already discharged through the first discharge process. Therefore, at the time when the second discharge process is started, residual electric charge in the fuel cell is less than residual electric charge while the first discharge process is being executed. Therefore, in the second discharge process, even when the magnetic coupling reactor is substantially disabled, a large current is hard to flow through the power converter. In this way, with the controller described in the specification, by changing the reactance of the magnetic coupling reactor, an excessive increase in the value of current flowing through the power converter is suppressed in the first discharge process, and residual electric charge in the fuel cell is quickly discharged in the second discharge process.

The specification discloses another aspect of a power supply system. The power supply system includes a power converter and a controller. The power converter includes a positive electrode line, a negative electrode line, a first switching element, a second switching element, a magnetic coupling reactor, and an auxiliary power supply. The positive electrode line is connected to a positive electrode of a fuel cell. The negative electrode line is connected to a negative electrode of the fuel cell. The first switching element is connected between the positive electrode line and the negative electrode line. The second switching element is connected between the positive electrode line and the negative electrode line in parallel with the first switching element. The magnetic coupling reactor includes a reactor core, a first coil, a second coil, and a third coil. The reactor core has a first outer leg, a second outer leg, a pair of yokes annularly coupling the first outer leg and the second outer leg, and a middle leg connecting the pair of yokes to each other. The first coil is connected between the first switching element and the fuel cell and is wound around the first outer leg of the reactor core. The second coil is connected between the second switching element and the fuel cell and is wound around the second outer leg of the reactor core. The second coil is magnetically differentially connected to the first coil. The third coil is wound around the middle leg of the reactor core and is magnetically cumulatively connected to the first coil and the second coil. The auxiliary power supply is configured to supply current to the third coil and is configured to cause the middle leg of the reactor core to magnetically saturate by supplying current to the third coil. The controller is configured to execute a third discharge process and a fourth discharge process, which is executed after the third discharge process, to discharge electric charge remaining in the fuel cell. The controller is configured to, in the third discharge process, turn on at least one of the first switching element and the second switching element in a state where the auxiliary power supply is off, and, in the fourth discharge process, turn on both the first switching element and the second switching element and turn on the auxiliary power supply.

With the above-described configuration, the third discharge process and the fourth discharge process are sequentially executed to discharge residual electric charge in the fuel cell. In the third discharge process, the controller turns on at least one of the first switching element and the second switching element in a state where the auxiliary power supply is off. Thus, residual electric charge in the fuel cell is discharged through at least one of the first coil and the second coil. The magnetic coupling reactor of this aspect includes a middle leg that connects the pair of yokes to each other. Thus, even if the two switching elements are turned on at the same time and a current flows through the two coils at the same time, magnetic fluxes respectively generated from the coils do not completely cancel out. Therefore, while the third discharge process is being executed, in the first coil and/or the second coil through which a current flows, an excessive increase in current flowing through the coil(s) is suppressed by the self-inductance. In the fourth discharge process that is executed after the third discharge process, both the first switching element and the second switching element are turned on, and the auxiliary power supply is turned on. Since a current flows through the third coil, magnetic flux is generated at the middle leg of the reactor core, and the middle leg magnetically saturates. As a result, magnetic fluxes respectively generated from the first coil and the second coil magnetically differentially connected to each other cancel out each other, so the reactance of the magnetic coupling reactor is substantially eliminated or reduced. An excessive increase in the value of current flowing through the power converter is suppressed in the third discharge process, and residual electric charge in the fuel cell is quickly discharged in the fourth discharge process.

The details of the technology disclosed in the specification and further improvement will be described in "Detailed Description of Embodiments".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the technology, the power converter may further include a smoothing capacitor provided at an output side of the power converter. With such a configuration, while the first discharge process and the second discharge process or the third discharge process and the fourth discharge process are being executed, accumulation of voltage in the smoothing capacitor is suppressed.

In one embodiment of the technology, the magnitude of mutual inductance between the first coil and the second coil may be less than the magnitude of self-inductance of the first coil. In another embodiment, the magnitude of mutual inductance may be equal to the magnitude of self-inductance of the first coil.

In one embodiment of the technology, the magnitude of mutual inductance between the first coil and the second coil may be equal to the magnitude of self-inductance of the first coil. With such a configuration, the reactance of the magnetic coupling reactor is eliminated in the second or fourth discharge process.

In one embodiment of the technology, the controller may have an overcurrent protection function that turns off the first switching element when a current greater than a first threshold flows through the first switching element. In this case, the first coil may have a self-inductance with which a current flowing through the first switching element is kept less than or equal to the first threshold in the first or third discharge process. With such a configuration, in the first or third discharge process, a current discharged via the first switching element is kept less than or equal to the first threshold. Therefore, in the first discharge process, the first switching element is not turned off by the overcurrent protection function. Hence, during the first or third discharge process, residual electric charge in the fuel cell is discharged from the positive electrode of the fuel cell to the negative electrode of the fuel cell.

In the one embodiment of the technology, the controller may be configured to start the second or fourth discharge process, after a current flowing through the first coil exceeds a predetermined threshold in the first or third discharge process. With such a configuration, in a state where the reactance of the magnetic coupling reactor is substantially eliminated or reduced through the second or fourth discharge process, flow of a current greater than the predetermined threshold through the first switching element and the second switching element is prevented. As a result, damage to the first switching element and the second switching element in the second or fourth discharge process is suppressed.

First Embodiment

Figure 1:
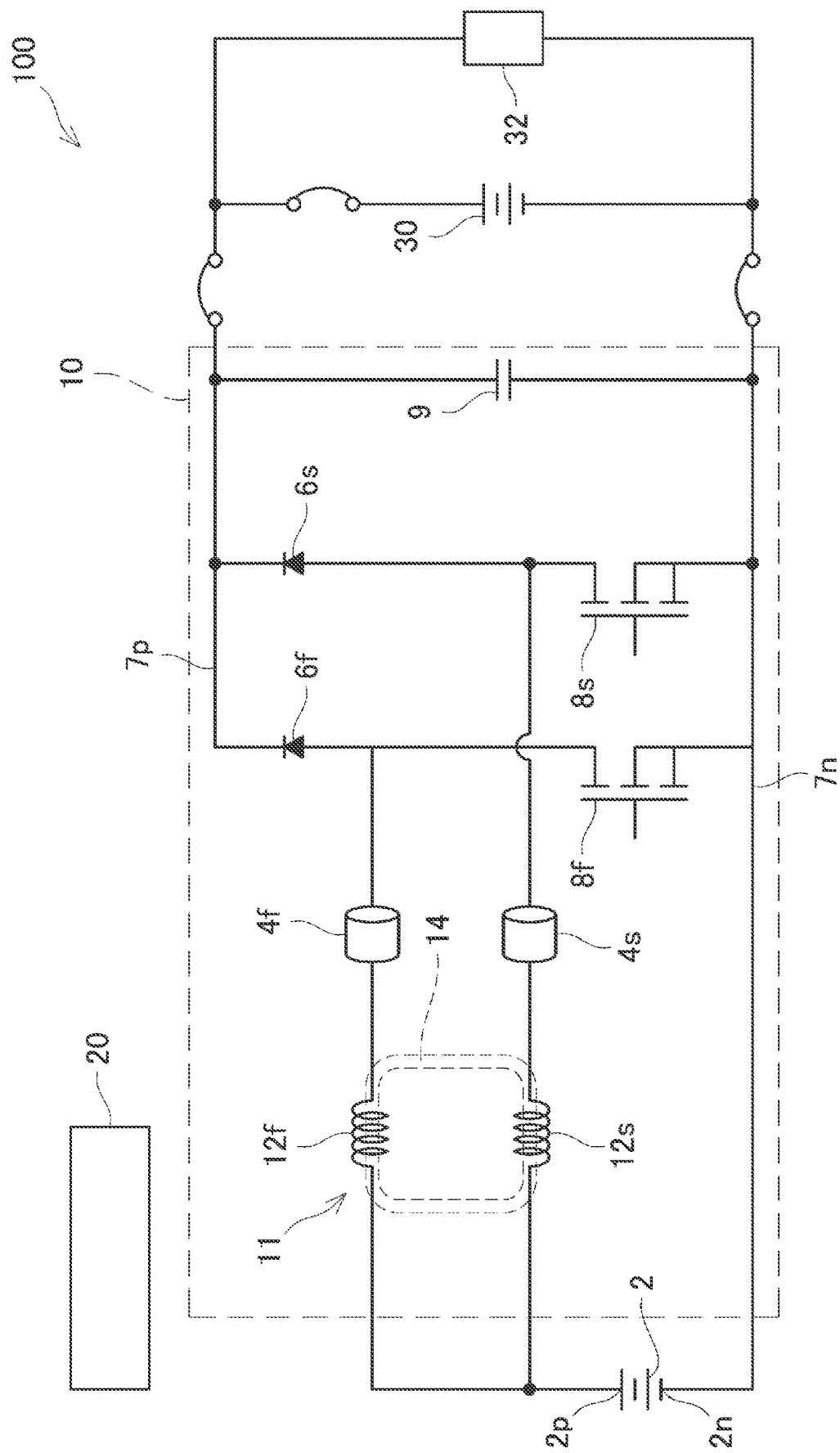
FIG. 1 is a block diagram of a power supply system according to a first embodiment.

Hereinafter, power supply systems according to embodiments will be described with reference to the accompanying drawings. FIG. 1 is a block diagram schematically showing a power supply system 100 according to a first embodiment. The power supply system 100 is, for example, mounted on a fuel cell electric vehicle (not shown). The fuel cell electric vehicle further includes a fuel cell 2, a secondary battery 30, and an inverter 32 in addition to the power supply system 100. Although not shown in the drawing, the fuel cell electric vehicle includes a motor connected to the inverter 32.

The fuel cell 2 includes a plurality of cells (not shown) connected in series with each other. Each of the cells includes an air electrode having a plurality of grooves for taking in oxygen, a fuel electrode having a plurality of grooves for taking in hydrogen, and an electrolyte membrane located between the air electrode and the fuel electrode. The fuel cell 2 generates electric power by reacting hydrogen and oxygen with each other in each cell. Electric power generated by the fuel cell 2 is supplied to the motor of the fuel cell electric vehicle via the power converter 10 and the inverter 32. Thus, the fuel cell electric vehicle runs. The fuel cell 2 includes a positive electrode 2p and a negative electrode 2n. As shown in FIG. 1, a positive electrode line 7p is connected to the positive electrode 2p of the fuel cell 2, and a negative electrode line 7n is connected to the negative electrode 2n of the fuel cell 2. The electrode lines 7p, 7n are electric lines included in a cable (not shown) that connects the fuel cell 2 with the power converter 10.

The secondary battery 30 is a so-called lithium ion battery. The secondary battery 30 is connected to the power converter 10 via a relay (not shown). The secondary battery 30 is used as a power supply for assisting the fuel cell 2 when the amount of electric power generated by the fuel cell 2 is small, for example, when the fuel cell 2 starts up, during heating and cooling operation of the fuel cell electric vehicle, or other times. The inverter 32 is connected to the output side of the secondary battery 30. The inverter 32 converts electric power from the fuel cell 2 and the secondary battery 30 to three-phase alternating current power and supplies the three-phase alternating current power to the motor (not shown).

The power supply system 100 includes the power converter 10 and a controller 20. The power converter 10 is a so-called DC-DC converter that steps up the voltage of electric power generated by the fuel cell 2. The power converter 10 includes a magnetic coupling reactor 11, a first current sensor 4f, a second current sensor 4s, a first switching element 8f, a second switching element 8s, a first diode 6f, a second diode 6s, and a smoothing capacitor 9.

Each of the two switching elements 8f, 8s is connected between the positive electrode line 7p and the negative electrode line 7n. The second switching element 8s is connected in parallel with the first switching element 8f. Each of the switching elements 8f, 8s is specifically a metal oxide semiconductor field effect transistor (MOSFET). In a modification, each of the switching elements 8f, 8s may be an insulated gate bipolar transistor (IGBT). The power converter 10 steps up electric power generated by the fuel cell 2 by turning on or off the two switching elements 8f, 8s. A technology that the power converter 10 steps up electric power is known, so the description thereof is omitted here.

Figure 2:
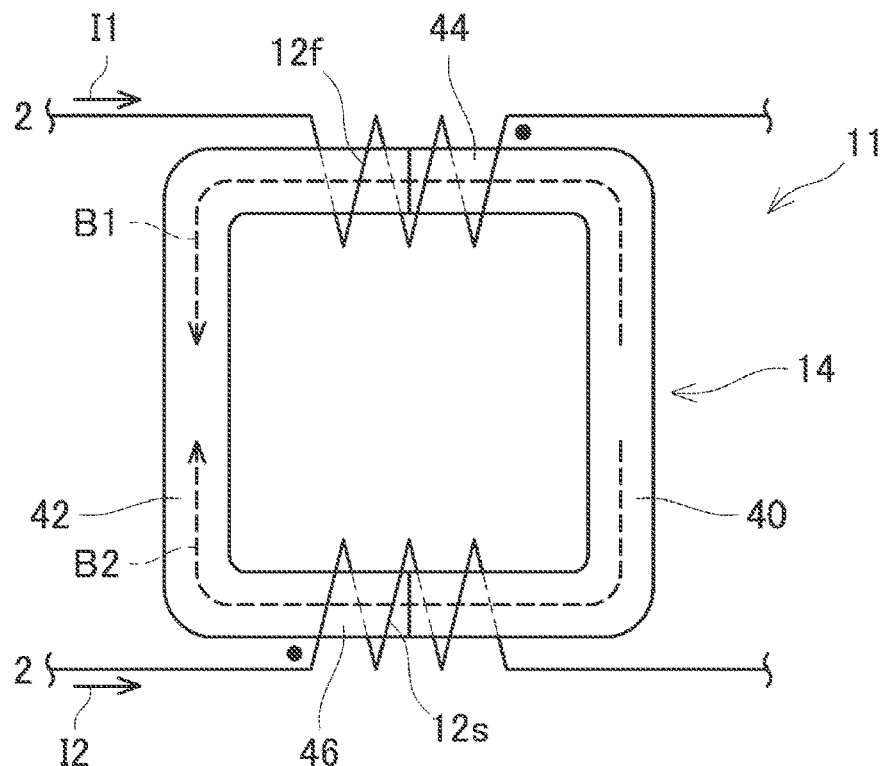
FIG. 2 is an enlarged diagram of a magnetic coupling reactor according to the first embodiment.

As shown in FIG. 2, the magnetic coupling reactor 11 includes a reactor core 14, a first coil 12f, and a second coil 12s. The polarity of the first coil 12f is indicated on a yoke 40 side, and the polarity of the second coil 12s is indicated on a yoke 42 side. In other words, the polarities of the windings of the coils 12f, 12f are opposite to each other. The reactor core 14 includes a first outer leg 44, a second outer leg 46, and the pair of yokes 40, 42. The reactor core 14 is typically a powder magnetic core compacted from soft magnetic metal particles. The reactor core 14 is a so-called ring core, and the parts 40, 42, 44, 46 are annularly coupled.

Each of the coils 12f, 12s is made up of a spiral conductor. The first coil 12f is wound around the first outer leg 44 of the reactor core 14. The second coil 12s is wound around the second outer leg 46 of the reactor core 14. When the first switching element 8f is turned on, a first current I1 flows through the first coil 12f. When the second switching element 8s is turned on, a second current I2 flows through the second coil 12s.

When the first switching element 8f is turned on and the first current I1 flows through the first coil 12f, a magnetic field is generated inside the first coil 12f. As a result, a first magnetic flux B1 is generated in the reactor core 14. As shown in FIG. 2, the first magnetic flux B1 heads from the yoke 40 toward the yoke 42 in the first outer leg 44.

Similarly, when the second switching element 8s is turned on and the second current I2 flows through the second coil 12s, a magnetic field is generated inside the second coil 12s, and a second magnetic flux B2 is generated in the reactor core 14. The second magnetic flux B2 heads from the yoke 40 toward the yoke 42 in the second outer leg 46.

When the two switching elements 8f, 8s are turned on, the magnetic fluxes B1, B2 are generated. As shown in FIG. 2, the first magnetic flux B1 heads downward in the yoke 42. On the other hand, the second magnetic flux B2 heads upward in the yoke 42. In other words, the directions of the magnetic fluxes B1, B2 are opposite to each other.

Therefore, when the two switching elements 8f, 8s are turned on, the second magnetic flux B2 generated by the second coil 12s cancels out the first magnetic flux B1 generated by the first coil 12f. In other words, the second coil 12s is magnetically differentially connected to the first coil 12f.

The first coil 12f of the magnetic coupling reactor 11 has a self-inductance L1. Similarly, the second coil 12s also has a self-inductance L1. In the magnetic coupling reactor 11, the magnitude of mutual inductance M1 between the first coil 12f and the second coil 12s is set so as to be equal to the magnitude of each self-inductance L1. The magnitude of each of the inductances is determined according to the number of turns of an associated one of the coils 12s, 12f, the size of the reactor core 14, a maximum magnetic flux density, and the like.

The controller 20 is a computer made up of a CPU, a memory, and the like. The controller 20 is electrically connected to the power converter 10. The controller 20, for example, receives the value of current flowing through the coil 12f from the current sensor 4f and the value of current flowing through the coil 12s from the current sensor 4s. The controller 20 sends a signal for turning on or off each of the switching elements 8f, 8s to the power converter 10 based on information related to running, for example, an accelerator operation amount of the fuel cell electric vehicle, and the like.

A first discharge process and a second discharge process that the controller 20 executes to discharge electric charge remaining in the fuel cell 2 will be described with reference to FIG. 3 to FIG. 5. The processes are executed when, for example, cables for supplying hydrogen and oxygen to the fuel cell 2 are removed from the fuel cell 2 by a worker at the time of maintenance of the fuel cell 2. Therefore, during the processes, the fuel cell 2 does not continue power generation. However, at the time when the cables are removed from the fuel cell 2, electric charge generated until the cables are removed is remaining in the fuel cell 2. For this reason, electric charge (that is, voltage) is remaining in the fuel cell 2. To prevent leakage of voltage remaining in the fuel cell 2 to outside the fuel cell 2 at the time of service of the fuel cell 2, or the like, residual voltage in the fuel cell 2 is desired to be quickly discharged.

The magnitude of voltage remaining in the fuel cell 2 changes according to a power generation condition and a power usage condition. Hereinafter, on the assumption that, at the time when the cables are removed from the fuel cell 2, a maximum residual voltage Vp that is the maximum voltage that can be remaining in the fuel cell 2 is remaining in the fuel cell 2, the processes executed by the controller 20 will be described.

The controller 20 executes the first discharge process over a first period P1 and then executes the second discharge process over a second period P2. In the first discharge process, the controller 20 turns on the first switching element 8f in a state where the second switching element 8s is off. Thus, the first current I1 flows through the first coil 12f, and the second current I2 does not flow through the second coil 12s.

Figure 3:
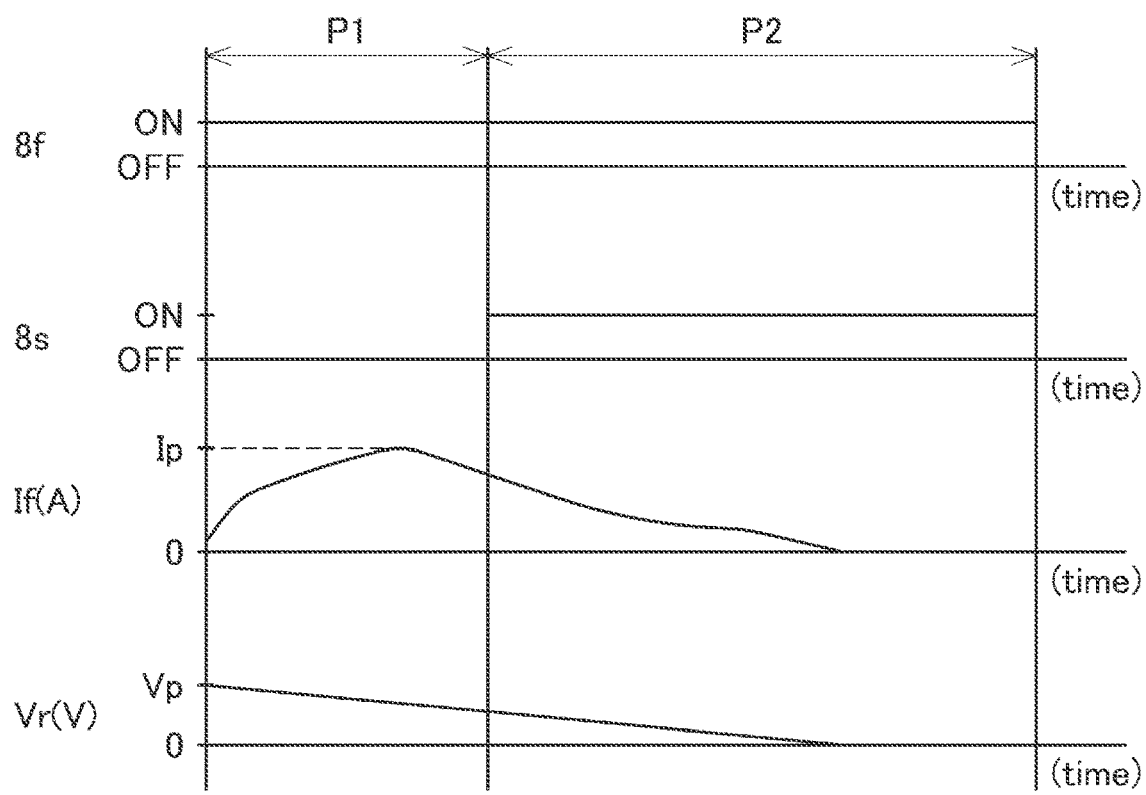
FIG. 3 is a graph of values in a first period and a second period.
Figure 4:
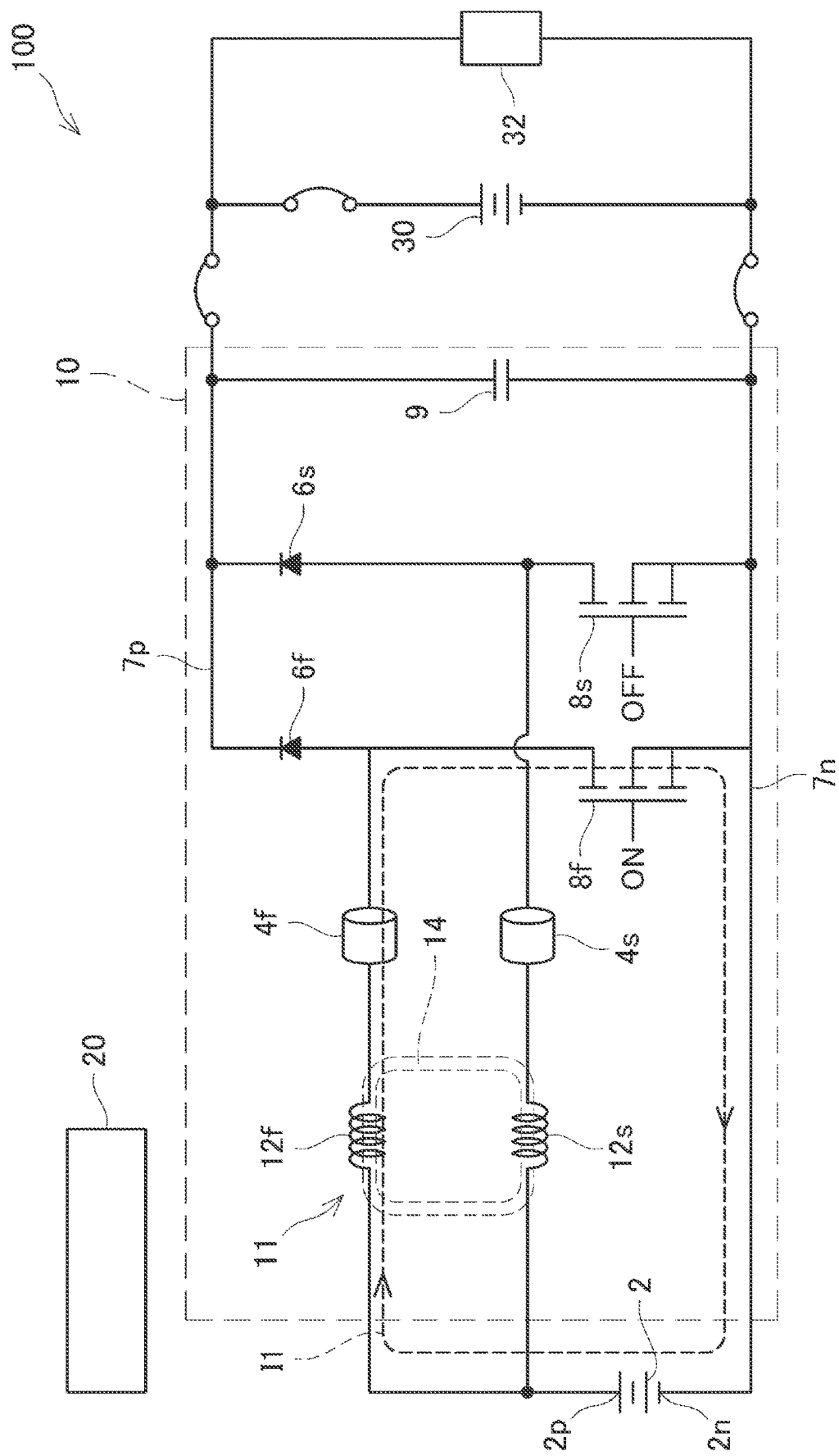
FIG. 4 is a diagram showing a path of discharge in the first period.
Figure 5:
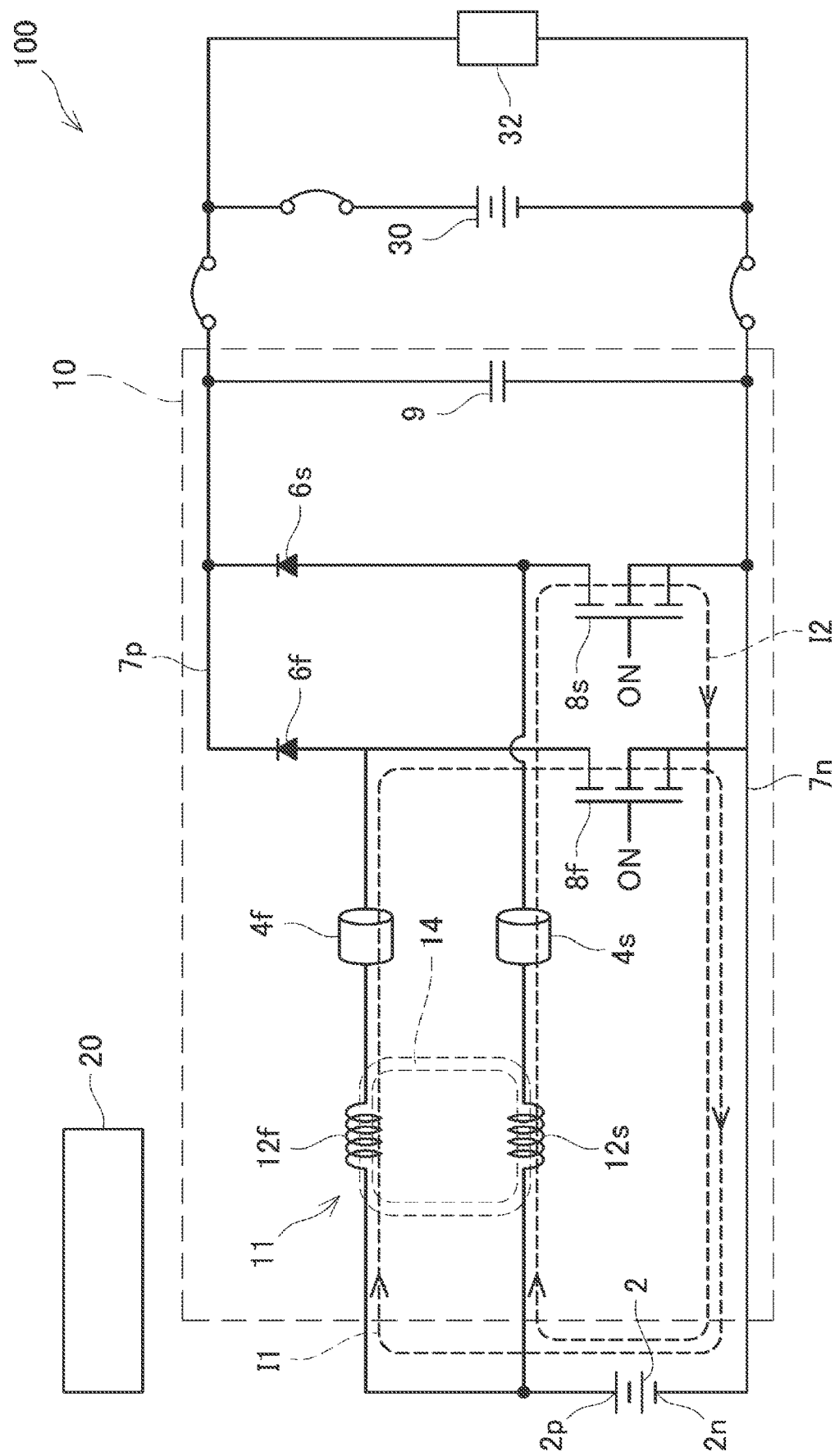
FIG. 5 is a diagram showing a path of discharge in the second period.
Figure 6:
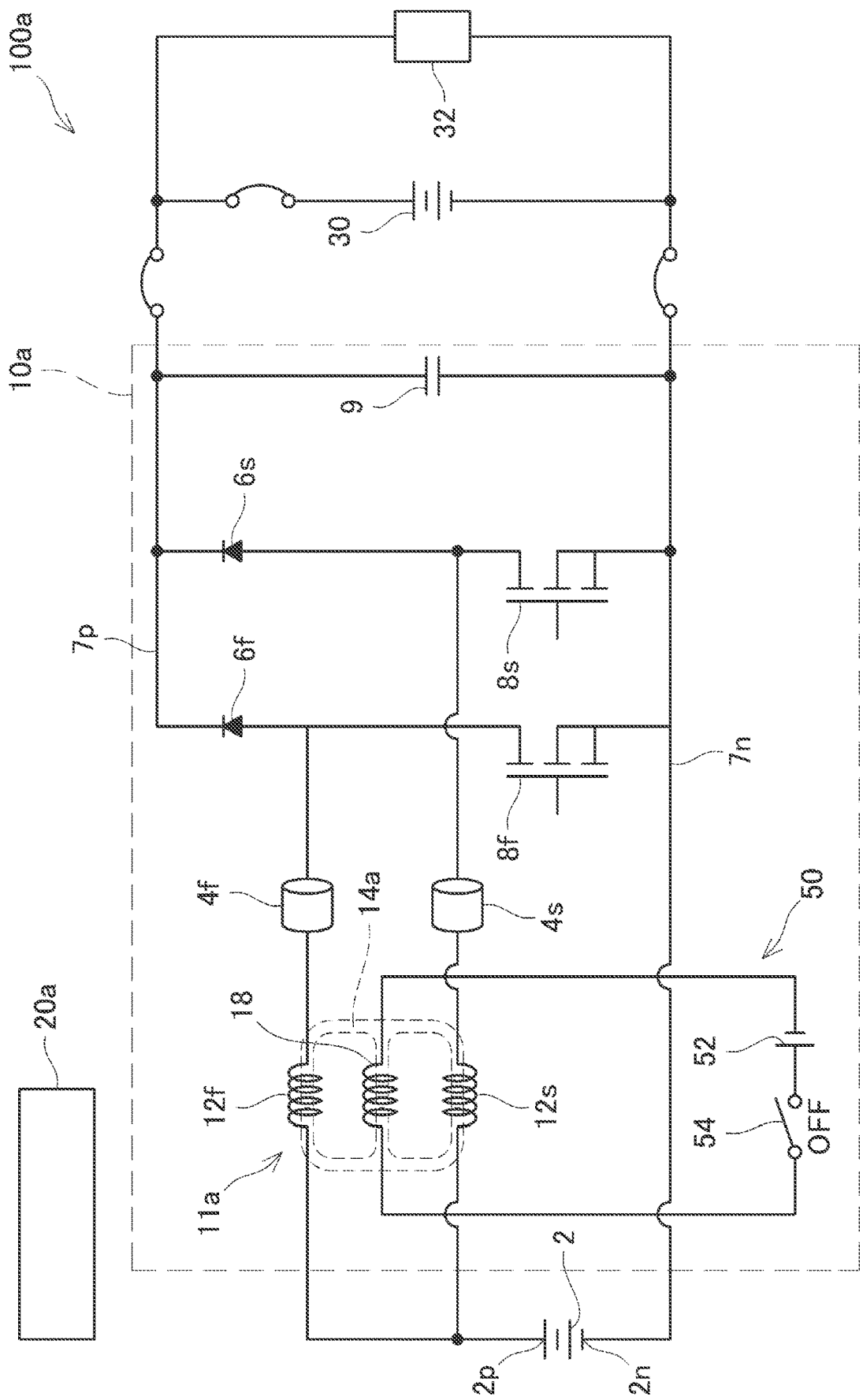
FIG. 6 is a block diagram of a power supply system according to a second embodiment.

As a result, as shown in FIG. 4, the first current I1 flows in order of the positive electrode 2p of the fuel cell 2, the first coil 12f, the first current sensor 4f, the first switching element 8f, and the negative electrode 2n. As a result, as shown in FIG. 3, residual voltage Vr in the fuel cell 2 gradually decreases from the maximum residual voltage Vp.

As a result, the value of the first current I1 flowing through the first coil 12f changes, so self-induction of the first coil 12f occurs in the first period P1. As a result, as shown in FIG. 3, a current value If measured by the first current sensor 4f gradually increases. When the first current I1 flows through the first coil 12f, the first magnetic flux B1 (see FIG. 2) is generated in the reactor core 14. As a result, the reactance (the self-inductance L1 of the first coil 120 occurs in the magnetic coupling reactor 11.

Here, the controller 20 has an overcurrent protection function that turns off the first switching element 8f when the value of current flowing through the first switching element 8f exceeds a first threshold. Thus, the controller 20 is able to prevent flow of a large current greater than the first threshold to the first switching element 8f. Therefore, if the current value If exceeds the first threshold, the controller 20 forcibly turns off the first switching element 8f. As a result, the first current I1 flows into the smoothing capacitor 9 without heading toward the negative electrode 2n of the fuel cell 2.

The current value If of the first current I1 is able to be calculated from the maximum residual voltage Vp of the fuel cell 2 and the value of the self-inductance L1 of the first coil 12f. The maximum residual voltage Vp is able to be calculated in advance according to the number of cells, and the like, of the fuel cell 2. The self-inductance L1 of the first coil 12f of the present embodiment is set to a value at which the current value If of the first current I1 does not exceed the first threshold for the calculated maximum residual voltage Vp. Therefore, the controller 20 does not forcibly turn off the first switching element 8f by the use of the overcurrent protection function in the first period P1. As a result, the first current I1 does not flow in. In other words, the first coil 12f of the present embodiment has a value of self-inductance L1 at which the overcurrent protection function of the controller 20 is not executed in the first period P1. Therefore, accumulation of voltage in the smoothing capacitor 9 is prevented. As a result, for example, excess of voltage accumulated in the smoothing capacitor 9 over an allowable value of the smoothing capacitor 9 is suppressed, so damage to the smoothing capacitor 9, the switching elements 8f, 8s, and the diodes 6f, 6s is prevented.

As shown in FIG. 3, the current value If of the first current I1 gradually increases, and then reaches a peak current Ip. The peak current Ip is the maximum value of current that can be generated in the first coil 12f by the maximum residual voltage Vp and is a value calculated from the maximum residual voltage Vp, the self-inductance L1 of the first coil 12f, and the like. The current value If of the first current I1 reaches the peak current Ip and then gradually decreases.

The controller 20 stores the value of the peak current Ip in the memory. After the controller 20 determines that the current value If of the first current I1, received from the first current sensor 4f, coincides with the peak current Ip, the controller 20 starts the second discharge process.

In the second discharge process, the controller 20 turns on the second switching element 8s in a state where the first switching element 8f is on. Thus, as shown in FIG. 5, in addition to the first current I1 flowing through the first coil 12f, the second current I2 flows in order of the positive electrode 2p of the fuel cell 2, the second coil 12s, the second current sensor 4s, the second switching element 8s, and the negative electrode 2n. As a result, as shown in FIG. 2, in addition to the first magnetic flux B1, the second magnetic flux B2 is generated in the reactor core 14.

The second coil 12s is differentially connected to the first coil 12f. Therefore, the first magnetic flux B1 and the second magnetic flux B2 cancel out each other. As a result, in the second period P2, the reactance of the magnetic coupling reactor 11 decreases as compared to the first period P1. The mutual inductance M1 between the first coil 12f and the second coil 12s is generated in a direction to cancel out the self-inductance L1 of the first coil 12f. The magnitude of the self-inductance L1 of each of the first coil 12f and the second coil 12s is equal to the magnitude of the mutual inductance M1 between the first coil 12f and the second coil 12s. Therefore, while the second discharge process is being executed, the self-inductance L1 of each of the coils 12f, 12s is cancelled out by the mutual inductance M1. As a result, while the second discharge process is being executed, the reactance of the magnetic coupling reactor 11a is eliminated.

Thus, the currents I1, I2 are able to respectively smoothly flow through the first coil 12f and the second coil 12s. In other words, the residual voltage Vr in the fuel cell 2 is able to be quickly discharged. In this way, the power supply system 100 according to the present embodiment, in the first discharge process, suppresses flow of a large current through the first switching element 8f by using the reactance of the magnetic coupling reactor 11. In addition, the power supply system 100, in the second discharge process, is able to quickly discharge residual electric charge in the fuel cell 2 by eliminating the reactance of the magnetic coupling reactor 11.

In the second discharge process, the reactance of the magnetic coupling reactor 11 decreases; however, the current value If reaches the peak current Ip in the first discharge process. In addition, since the cables for supplying hydrogen and oxygen to the fuel cell 2 are removed, the fuel cell 2 does not generate electric power during execution of each of the discharge processes. For this reason, in the second discharge process, a large current greater than the peak current Ip does not flow through the first switching element 8f or the second switching element 8s. Since a large current does not flow through the switching elements 8f, 8s in the second period P2 during which the reactance of the magnetic coupling reactor 11 is eliminated, damage to the two switching elements 8f, 8s is suppressed. In addition, since a large current does not flow through the switching elements 8f, 8s in the second period P2, the controller 20 does not turn off the two switching elements 8f, 8s in the second period P2 by the use of the overcurrent protection function. Therefore, flow of a large current into the smoothing capacitor 9 is prevented.

Second Embodiment

Hereinafter, a power supply system 100a according to a second embodiment will be described with reference to FIG. 6 to FIG. 10. The power supply system 100a is a system in which, in the power supply system 100 of the first embodiment, the power converter 10 is replaced with a power converter 10a and the controller 20 is replaced with a controller 20a. The power converter 10a is the one in which the magnetic coupling reactor 11 of the power converter 10 is replaced with a magnetic coupling reactor 11a and an auxiliary power supply circuit 50 is added. Other than the above components, each of the power supply systems 100, 100a has a similar configuration.

The magnetic coupling reactor 11a further includes a third coil 18 in addition to the first coil 12f and the second coil 12s. The auxiliary power supply circuit 50 is a circuit connected to the third coil 18, and includes an auxiliary power supply 52 and a switch 54. The switch 54 is electrically connected to the controller 20a.

Figure 7:
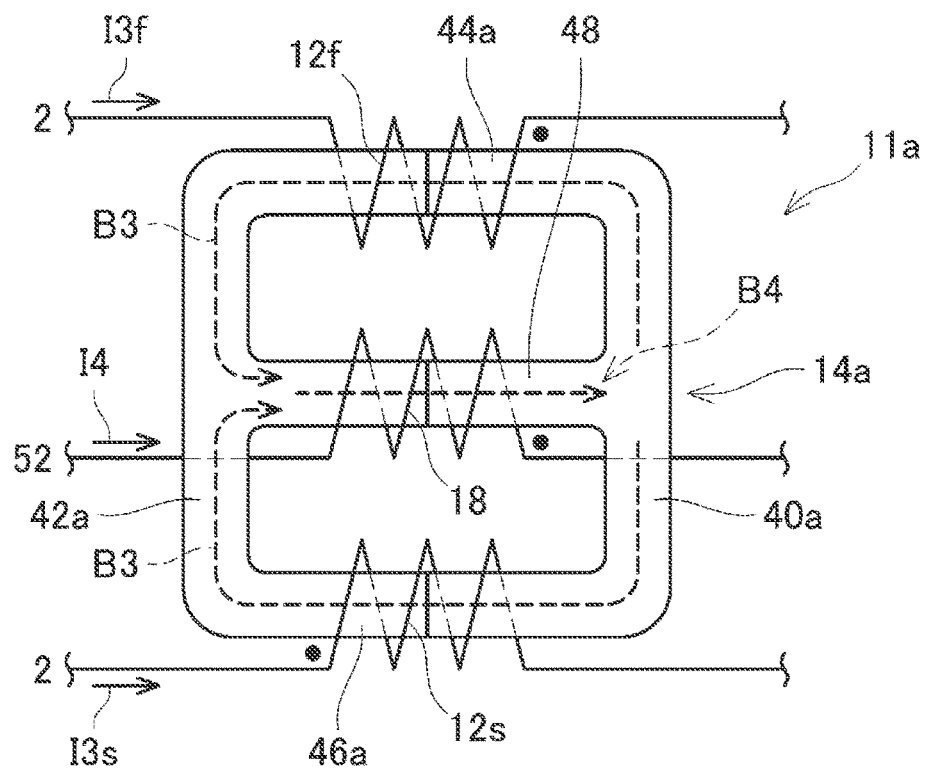
FIG. 7 is an enlarged diagram of a magnetic coupling reactor according to the second embodiment.

As shown in FIG. 7, a reactor core 14a of the magnetic coupling reactor 11a further includes a middle leg 48 in addition to a first outer leg 44a, a second outer leg 46a, and a pair of yokes 40a, 42a. The yokes 40a, 42a annularly couple the outer legs 44a, 46a. The middle leg 48 connects the yokes 40a, 42a to each other. The reactor core 14a is formed by joining a pair of E-shaped cores with each other such that the cores face each other.

In the magnetic coupling reactor 11a, when the two switching elements 8f, 8s are turned on and third currents I3f, I3s respectively flow through coils 12f, 12s, a pair of third magnetic fluxes B3 is generated in the reactor core 14a. As shown in FIG. 7, one of the third magnetic fluxes B3 heads from the yoke 40a toward the yoke 42a in the first outer leg 44a, and the other one of the third magnetic fluxes B3 heads from the yoke 40a toward the yoke 42a in the second outer leg 46a. In other words, the third magnetic fluxes B3 are opposite to each other.

However, the reactor core 14a includes the middle leg 48. Therefore, the magnetic fluxes B3 do not cancel out each other and enter the middle leg 48 and head from the yoke 42a toward the yoke 40a. Therefore, even when currents respectively flow through the coils 12f, 12s, a reactance (the self-inductance L1 of each of the coils 12f, 12s) is generated in the magnetic coupling reactor 11a of the present embodiment.

The third coil 18 has a polarity opposite to the polarity of the second coil 12s. Therefore, when a fourth current I4 flows through the third coil 18, a fourth magnetic flux B4 heading from the yoke 42a toward the yoke 40a is generated in the middle leg 48. In other words, when the fourth current I4 flows through the third coil 18, the fourth magnetic flux B4 in the same direction as the magnetic fluxes B3 is generated in the middle leg 48. In other words, the third coil 18 is magnetically cumulatively connected to the first coil 12f and the second coil 12s.

Therefore, when currents I3f, I3s, 14 respectively flow through the coils 12f, 12s, 18, the magnetic flux density of the middle leg 48 increases, so the middle leg 48 is magnetically saturated. When the middle leg 48 is magnetically saturated, the magnetic fluxes B3 are not able to enter the middle leg 48. As a result, as in the case of the magnetic fluxes B1, B2 described with reference to FIG. 2, the magnetic fluxes B3 cancel out each other. Thus, the reactance of the magnetic coupling reactor 11a reduces. In this way, the magnetic coupling reactor 11a of the second embodiment is able to substantially eliminate or reduce the reactance by magnetically saturating the middle leg 48.

Figure 8:
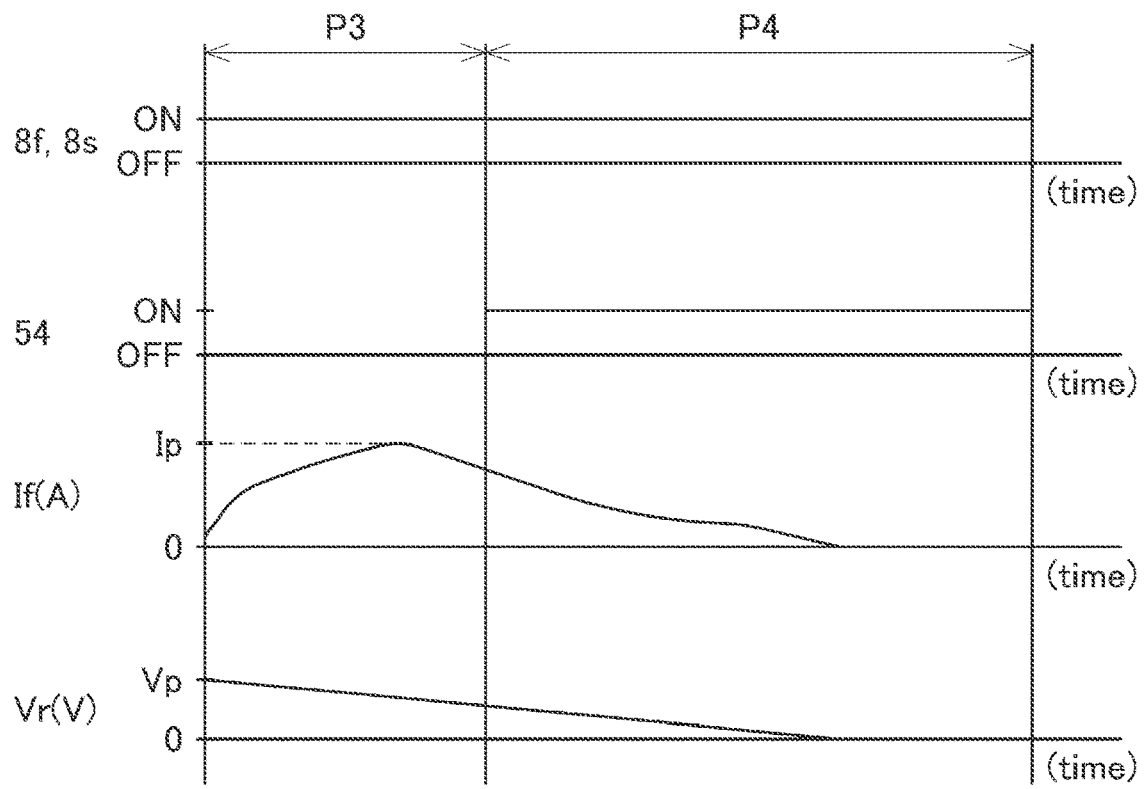
FIG. 8 is a graph of values in a third period and a fourth period.

Processes that the controller 20a executes to discharge electric charge remaining in the fuel cell 2 will be described with reference to FIG. 8 to FIG. 10. As in the case of the above-described first discharge process and second discharge process, the controller 20a executes a third discharge process and a fourth discharge process when, for example, the cables for supplying hydrogen and oxygen to the fuel cell 2 are removed from the fuel cell 2 by a worker.

The controller 20a executes the third discharge process over a third period P3 and then executes the fourth discharge process over a fourth period P4. In the third discharge process, the controller 20a turns on the two switching elements 8f, 8s in a state where the switch 54 of the auxiliary power supply circuit 50 is off. Thus, the first current I1 flows through the first coil 12f, and the second current I2 flows through the second coil 12s. As a result, the third magnetic fluxes B3 (see FIG. 7) are generated in the reactor core 14a. As a result, the reactance (the self-inductance L1 of each of the coils 12f, 12s) occurs in the magnetic coupling reactor 11a.

Figure 9:
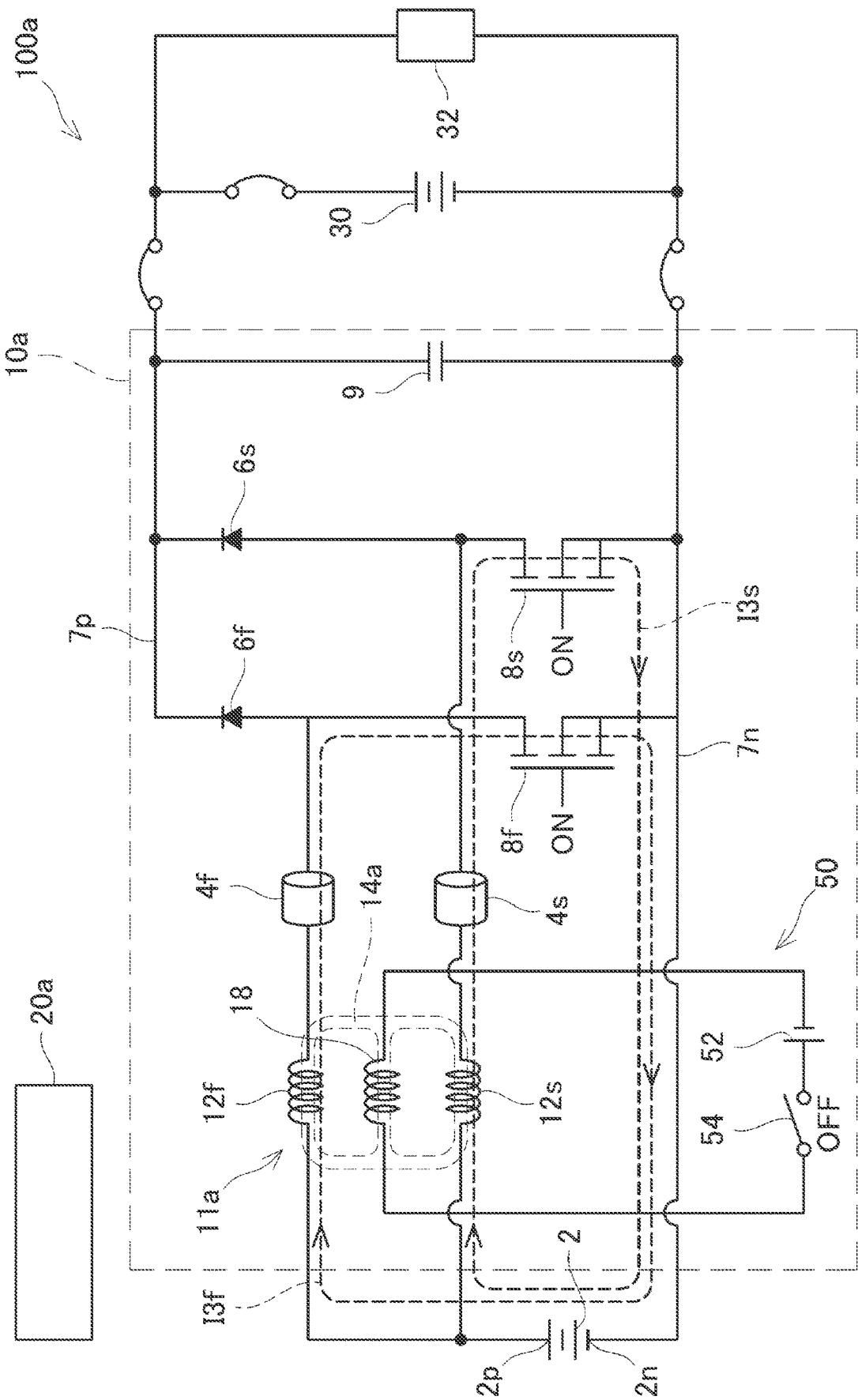
FIG. 9 is a diagram showing a path of discharge in the third period.
Figure 10:
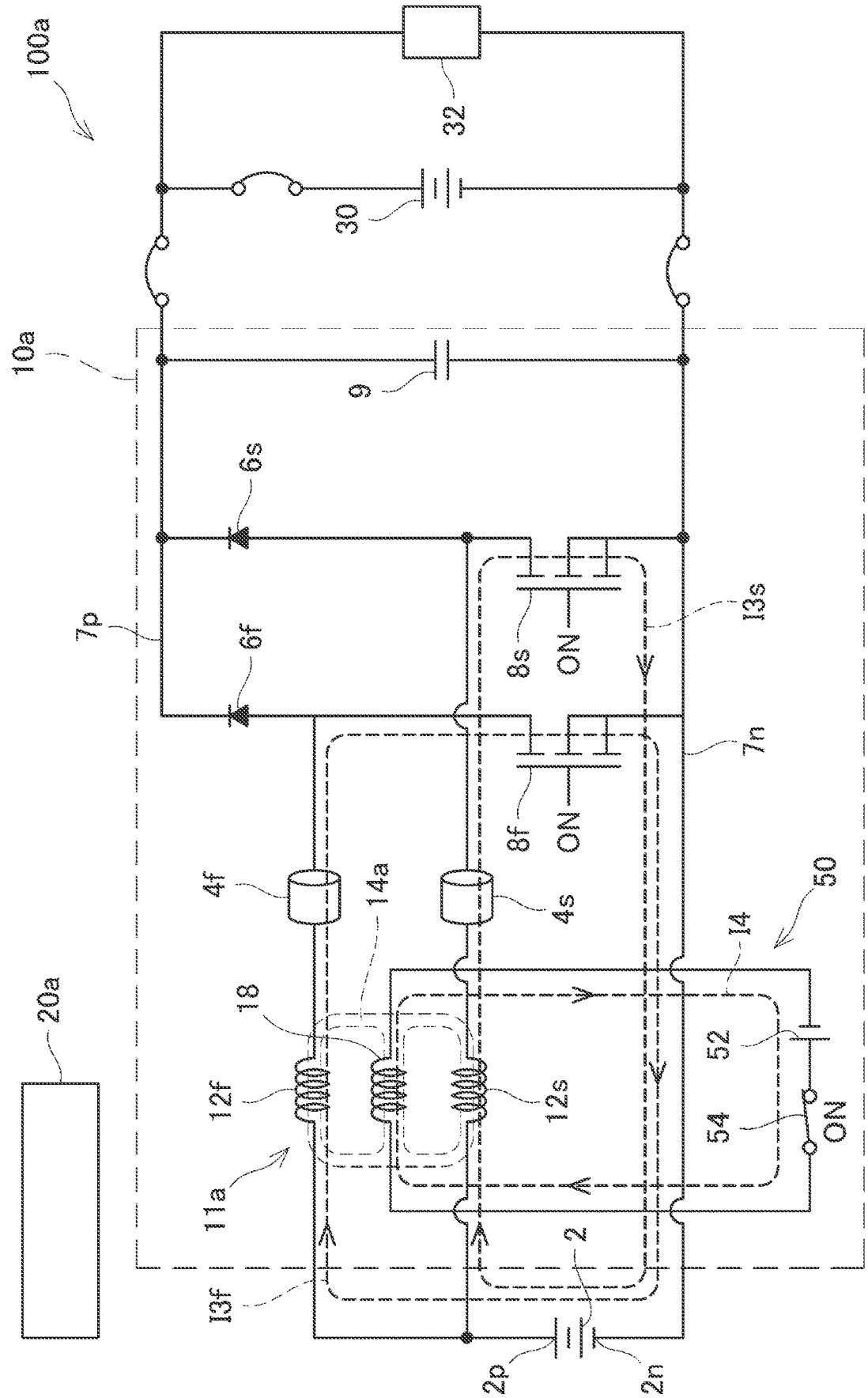
FIG. 10 is a diagram showing a path of discharge in the fourth period.

When the third discharge process is started and the two switching elements 8f, 8s are turned on, the third current I3f flows in order of the positive electrode 2p of the fuel cell 2, the first coil 12f, the first current sensor 4f, the first switching element 8f, and the negative electrode 2n, as shown in FIG. 9. In addition, the third current I3s flows in order of the positive electrode 2p of the fuel cell 2, the second coil 12s, the second current sensor 4s, the second switching element 8s, and the negative electrode 2n. As a result, residual voltage Vr in the fuel cell 2 gradually decreases from the maximum residual voltage Vp. Thus, as in the case of the above-described first period P1, for example, the current value If measured by the first current sensor 4f gradually increases through the self-induction of each of the coils 12f, 12s. Although not shown in FIG. 8, the current value measured by the second current sensor 4s also similarly gradually increases.

After that, the controller 20a starts the fourth discharge process after the current value If coincides with the peak current Ip. In the fourth discharge process, the switch 54 of the auxiliary power supply circuit 50 is turned on in a state where the two switching elements 8f, 8s are on. Thus, as shown in FIG. 10, the fourth current I4 flows through the third coil 18 from the auxiliary power supply 52 of the auxiliary power supply circuit 50. As a result, as shown in FIG. 7, in addition to the third magnetic fluxes B3, the fourth magnetic flux B4 is generated in the reactor core 14a.

As described above, the third coil 18 is magnetically cumulatively connected to the first coil 12f and the second coil 12s. Therefore, when the fourth current I4 flows through the third coil 18 in a state where the third currents I3f, I3s are respectively flowing through the first coil 12f and the second coil 12s, the middle leg 48 of the reactor core 14a is magnetically saturated. As a result, the third magnetic fluxes B3 are not able to enter the middle leg 48 of the reactor core 14a. As a result, as in the case of the magnetic fluxes B1, B2 in the second discharge process described with reference to FIG. 2, the third magnetic fluxes B3 respectively generated by the first coil 12f and the second coil 12s magnetically differentially connected to each other cancel out each other.

A mutual inductance M1 occurs between the first coil 12f and the second coil 12s in a direction to cancel out the self-inductance L1 of each of the coils 12f, 12s. As described above, the magnitude of the self-inductance L1 of each of the coils 12f, 12s is equal to the magnitude of the mutual inductance M1. Therefore, while the fourth discharge process is being executed, the self-inductance L1 of each of the coils 12f, 12s is cancelled out by the mutual inductance M1. As a result, while the fourth discharge process is being executed, the reactance of the magnetic coupling reactor 11a is eliminated. Thus, currents respectively easily flow through the first coil 12f and the second coil 12s. In other words, the residual voltage Vr in the fuel cell 2 is able to be quickly discharged.

In the power supply system 100a of the present embodiment, the reactance of the magnetic coupling reactor 11a is substantially eliminated by using the third coil 18 separately configured from the first coil 12f and the second coil 12s needed to convert electric power generated by the fuel cell 2. Therefore, a circuit suitable for the third and fourth discharge processes is able to be made up of the third coil 18 and the auxiliary power supply circuit 50 without influence on conversion of electric power generated by the fuel cell 2.

Specific examples of the technology disclosed in the specification have been described in detail; however, these are only illustrative and are not intended to limit the scope of the appended claims. The technology described in the appended claims also encompasses various modifications and changes from the specific examples illustrated above. Modifications of the above-described embodiments will be described below.

First Modification

The power supply systems 100, 100a do not need to include the smoothing capacitor 9.

Second Modification

The magnitude of the mutual inductance M1 between the first coil 12f and the second coil 12s does not need to be equal to the magnitude of the self-inductance L1 of the first coil 12f. For example, the magnitude of the mutual inductance M1 between the first coil 12f and the second coil 12s may be set so as to be less than the magnitude of the self-inductance L1 of the first coil 12f. In this case, the magnitude of the self-inductance of each of the coils 12f, 12s may be changed according to a step-up capability desired for the power converter 10 or the power converter 10a.

Third Modification

The controller 20 does not need to have an overcurrent protection function according to the capacity of electric power generated by the fuel cell 2, or the like. In this case, the first coil 12f does not need to have a self-inductance L1 for keeping the first current I1, flowing through the first switching element 8f, less than or equal to the first threshold.

Fourth Modification

The controller 20 does not need to start the second discharge process after the current value If exceeds the peak current Ip. For example, the controller 20 may start the second discharge process after a lapse of a predetermined period of time from the start of the first discharge process.

Fifth Modification

The controller 20 executes the discharge processes when the cables for supplying oxygen and hydrogen to the fuel cell 2 are removed from the fuel cell 2. However, for example, the controller 20 does not need to execute the discharge processes when the controller 20 receives a quick discharge instruction from a user. In further another modification, for example, the controller 20 may, when the fuel cell electric vehicle is submerged in water or the like or when there occurs a possibility of ground fault, receives a signal indicating occurrence of that event from the fuel cell electric vehicle, and, as a result, automatically execute the discharge processes.

Sixth Modification

The controller 20a of the second embodiment does not need to turn on both the first switching element 8f and the second coil 12s in the third discharge process and may, for example, turn on only the first switching element 8f. In this case, the controller 20a just needs to turn on the second switching element 8s at the start of the fourth discharge process.

The technical elements described in the specification or the drawings exhibit technical usability solely or in various combinations and are not limited to combinations of the appended claims at the time of filing the application. The technology illustrated in the specification and drawings can achieve multiple purposes at the same time and has technical usability by achieving one of those purposes.

What is claimed is:

1. A power supply system comprising:
a power converter; and
a controller, wherein:
the power converter includes
a positive electrode line connected to a positive electrode of a fuel cell,
a negative electrode line connected to a negative electrode of the fuel cell,
a first switching element connected between the positive electrode line and the negative electrode line,
a second switching element connected between the positive electrode line and the negative electrode line in parallel with the first switching element, and
a magnetic coupling reactor including
a reactor core including a first outer leg, a second outer leg, and a pair of yokes annularly coupling the first outer leg and the second outer leg,
a first coil connected between the first switching element and the fuel cell and wound around the first outer leg of the reactor core, and
a second coil connected between the second switching element and the fuel cell and wound around the second outer leg of the reactor core, the second coil being magnetically differentially connected to the first coil; and
the controller is configured to
execute a first discharge process and a second discharge process to discharge electric charge remaining in the fuel cell, the second discharge process being executed after the first discharge process, in the first discharge process, turn on the first switching element in a state where the second switching element is off, and in the second discharge process, turn on the second switching element in a state where the first switching element is on.

2. The power supply system according to claim 1, wherein the power converter further includes a smoothing capacitor provided at an output side of the power converter.

3. The power supply system according to claim 1, wherein a magnitude of mutual inductance between the first coil and the second coil is less than a magnitude of self-inductance of the first coil.

4. The power supply system according to claim 1, wherein a magnitude of mutual inductance between the first coil and the second coil is equal to a magnitude of self-inductance of the first coil.

5. The power supply system according to claim 1, wherein:

the controller is configured to turn off the first switching element when a current greater than a first threshold flows through the first switching element; and the first coil has a self-inductance with which a current flowing through the first switching element is kept less than or equal to the first threshold in the first discharge process.

6. The power supply system according to claim 1, wherein the controller is configured to start the second discharge process, after a current flowing through the first coil exceeds a predetermined threshold in the first discharge process.

7. A power supply system comprising:

a power converter; and a controller, wherein:

the power converter includes a positive electrode line connected to a positive electrode of a fuel cell, a negative electrode line connected to a negative electrode of the fuel cell, a first switching element connected between the positive electrode line and the negative electrode line, a second switching element connected between the positive electrode line and the negative electrode line in parallel with the first switching element, a magnetic coupling reactor including a reactor core including a first outer leg, a second outer leg, a pair of yokes annularly coupling the first outer leg and the second outer leg, and a middle leg connecting the pair of yokes to each other, a first coil connected between the first switching element and the fuel cell and wound around the first outer leg of the reactor core, a second coil connected between the second switching element and the fuel cell and wound around the second outer leg of the reactor core, the second coil being magnetically differentially connected to the first coil, and a third coil wound around the middle leg of the reactor core and magnetically cumulatively connected to the first coil and the second coil; and an auxiliary power supply configured to supply current to the third coil and configured to cause the middle leg of the reactor core to magnetically saturate by supplying current to the third coil; and the controller is configured to execute a third discharge process and a fourth discharge process to discharge electric charge remaining in the fuel cell, the fourth discharge process being executed after the third discharge process, in the third discharge process, turn on at least one of the first switching element and the second switching element in a state where the auxiliary power supply is off, and in the fourth discharge process, turn on both the first switching element and the second switching element and turn on the auxiliary power supply.

8. The power supply system according to claim 7, wherein the controller is configured to turn on both the first switching element and the second switching element in the third discharge process.

9. The power supply system according to claim 7, wherein the power converter further includes a smoothing capacitor provided at an output side of the power converter.

10. The power supply system according to claim 7, wherein a magnitude of mutual inductance between the first coil and the second coil is less than a magnitude of self-inductance of the first coil.

11. The power supply system according to claim 7, wherein a magnitude of mutual inductance between the first coil and the second coil is equal to a magnitude of self-inductance of the first coil.

12. The power supply system according to claim 7, wherein:

the controller is configured to turn off the first switching element when a current greater than a first threshold flows through the first switching element; and the first coil has a self-inductance with which a current flowing through the first switching element is kept less than or equal to the first threshold in the third discharge process.

13. The power supply system according to claim 7, wherein the controller is configured to start the fourth discharge process, after a current flowing through the first coil exceeds a predetermined threshold in the third discharge process.

* * * * *